United States Patent
Cox

(10) Patent No.: US 9,784,759 B2
(45) Date of Patent: Oct. 10, 2017

(54) THERMALLY INSENSITIVE OPEN-LOOP HUNG MASS ACCELEROMETER WITH DIFFERENTIAL EDDY CURRENT SENSING

(71) Applicant: Raytheon Company, Waltham, MA (US)

(72) Inventor: Christopher A. Cox, Torrance, CA (US)

(73) Assignee: Raytheon Company, Waltham, MA (US)

(*) Notice: Subject to any disclaimer, the term of this patent is extended or adjusted under 35 U.S.C. 154(b) by 135 days.

(21) Appl. No.: 14/942,073

(22) Filed: Nov. 16, 2015

(65) Prior Publication Data

US 2017/0138980 A1    May 18, 2017

(51) Int. Cl.
G01P 15/11    (2006.01)

(52) U.S. Cl.
CPC ............................ *G01P 15/11* (2013.01)

(58) Field of Classification Search
CPC ....................................................... G01P 15/11
USPC ....................................................... 73/514.31
See application file for complete search history.

(56) References Cited

U.S. PATENT DOCUMENTS

| | | |
|---|---|---|
| 3,508,445 A | 4/1970 | Penney, Jr. et al. |
| 4,563,643 A | 1/1986 | Leschek et al. |
| 4,816,759 A | 3/1989 | Ames et al. |
| 4,866,418 A | 9/1989 | Dobler et al. |
| 5,214,379 A | 5/1993 | Chern |
| 5,756,896 A | 5/1998 | Schendel |
| 6,062,081 A | 5/2000 | Schendel |
| 6,912,902 B2 | 7/2005 | Malametz et al. |
| 7,104,128 B2 | 9/2006 | Inglese et al. |
| 7,757,555 B2 | 7/2010 | Pan et al. |
| 2003/0071612 A1 | 4/2003 | Daalmans et al. |
| 2003/0193396 A1 | 10/2003 | Daalmans et al. |
| 2010/0083761 A1 | 4/2010 | Dwyer et al. |
| 2011/0203377 A1 | 8/2011 | Seto |
| 2011/0252887 A1 | 10/2011 | Cardarelli |

(Continued)

FOREIGN PATENT DOCUMENTS

DE    102007005297 A1    11/2007
EP    0816855 A1    1/1998

OTHER PUBLICATIONS

Accelerometer Design, Chapter 2, http://14.139.116.29/bitstream/10603/2272/8/08_chapter%202.pdf, 2008.

(Continued)

*Primary Examiner* — John Chapman, Jr.
(74) *Attorney, Agent, or Firm* — Eric A. Gifford

(57) ABSTRACT

A thermally insensitive open-loop hung mass accelerometer utilizes a transverse geometry to attach the body/flexures/proof mass so that thermal expansion effects due to thermal gradients across the accelerometer or bulk temperatures changes of one flexure relative to the other cause minimal or no axial displacement of the proof mass. In this geometry, multiple flexures may be stacked to achieve the required stiffness, thus reducing manufacturing costs and any tolerancing issues, without affecting thermal sensitivity. The accelerometer is suitably designed to exhibit a radial symmetry. The accelerometer is suitably designed to use low CTE materials for at least the proof mass and body and a low thermal expansion differential Eddy current sensor head.

20 Claims, 12 Drawing Sheets

(56) References Cited

U.S. PATENT DOCUMENTS

2014/0157897 A1  6/2014  Anagnost

OTHER PUBLICATIONS

Blueline Engineering, Inductive Eddy Current Technology, http://www.bluelineengineering.com/Eddy%20Curent%20Sensors.html, 2012.

Garcia-Martin et al.,"Non-Destructive Techniques Based on Eddy Current Testing," Sensors 2011, 11, ISSN, pp/ pp. 2525-2565, published Feb. 28, 2011.

Becka et al., "A High Reliability Solid State Accelerometer," AIAA Guidance, Navigation and Control Conference and Exhibit Aug. 18-21, 2008, Honolulu, Hawaii.

Hopkins et al, The Silicon Oscillating Accelerometer: A High-Performance MEMS Accelerometer for Precision Navigation and Strategic Guidance Applications, Presented at the Institute of Navigation o 61st Annual Meeting, Cambridge, MA Jun. 27-29, 2005.

THERMALLY INSENSITIVE OPEN-LOOP HUNG MASS ACCELEROMETER WITH DIFFERENTIAL EDDY CURRENT SENSING

RELATED APPLICATIONS

This application is related to U.S. Patent Publication US2014/0157897 published Jun. 12, 2014 entitled "Hung Mass Accelerometer with Differential Eddy Current Sensing", which is hereby incorporated by reference.

BACKGROUND OF THE INVENTION

Field of the Invention

This invention relates to accelerometers and more particularly to a class of thermally insensitive hung mass accelerometers that use differential Eddy current sensing to provide improved sensitivity at lower cost and with higher reliability.

Description of the Related Art

The basic, open-loop accelerometer consists of a proof mass attached to a spring or flexure. The mass is constrained to move only in-line with the spring. Acceleration causes deflection of the mass. The displacement of the mass is measured. The acceleration is derived from the values of displacement, mass, and the spring constant. The system must not be driven at a resonance that would cause it to exceed its travel limits and bottom out. One way to achieve this is to damp the system. Another way is to mount the accelerometer on an isolation system. A closed-loop accelerometer typically achieves higher performance by using a feedback loop to cancel the deflection, thus keeping the mass nearly stationary. Whenever the mass deflects, the feedback loop causes an electric coil to apply an equally negative force on the mass, canceling the motion. Acceleration is derived from the amount of negative force applied. Because the mass barely moves, the sensitivity to non-linearities of the spring and damping system are greatly reduced. In addition, this accelerometer provides for increased bandwidth past the natural frequency of the sensing element. (Excerpted from Wikipedia "Inertial Navigation System" and "Accelerometer").

Conceptually, an accelerometer behaves as a damped mass on a spring. When the accelerometer experiences acceleration, the mass is displaced to the point that the spring is able to accelerate the mass at the same rate as the accelerometer body. The displacement is then measured to give the acceleration.

The performance of an accelerometer is primarily a combination of its bias stability and scale factor error. Bias stability is the acceleration measured by the device if the actual acceleration is zero. If the device is not accelerating due to imperfections of the device and electronics the readout will be nonzero. The scale factor error reflects the error as proportional to the actual acceleration. If for example the device is accelerating at 1 g (32 feet/sec/sec) [1 g is either 32.2 ft/sec/sec or 9.8 meters/sec/sec] and the device reads out 1.1 g, the scale factor error is 10%.

U.S. Patent Publication US2014/0157897 published Jun. 12, 2014 entitled "Hung Mass Accelerometer with Differential Eddy Current Sensing" and assigned to Raytheon Company introduced a new class of open-loop accelerometer that provides improved performance at lower cost and with higher reliability. As illustrated in FIGS. 5a and 5b and as described in paragraph [0046], an embodiment of an open-loop hung mass accelerometer 100 sans the electronics comprises a single piece of metal 101 (e.g. Ti 6A1-4V or 17-4PH stainless steel) machined to form a body 102, top and bottom flexures 104 and 106 and a proof mass 108 suspended between the flexures inside an internal cavity 109 to deflect along an axis 110 through the center of the body. Each flexure includes three flexure legs that are spaced at 120°. Each flexure leg is attached in the axial direction between the proof mass 108 and the body 102. Eddy current sensor heads 112 and 114 extend through holes in the body and through the flexures along axis 110. To position the sensor heads close to the proof mass, the sensor heads comprise a hollow stainless steel cylinder typically 0.25 to 0.5 inches long. At the end of the cylinder is a coil of copper wire that does the sensing/measurement. Between the copper coil and the mounting surface (0.25 to 0.5 inches away) are: the steel cylinder, G10 and various epoxies.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

Testing of Raytheon's open-loop hung mass accelerometer revealed that tight thermal control of this original design was required to achieve desired bias stability and scale factor error performance. In particular, axial or transverse temperature gradients could produce false accelerations.

The present invention provides a thermally insensitive open-loop hung mass accelerometer that addresses thermal limitations of the original design. In different embodiments, the geometry of the body/flexures/proof mass attachments is changed so that thermal expansion effects due to thermal gradients across the accelerometer or bulk temperatures changes of one flexure relative to the other cause minimal or no axial displacement of the proof mass. In this geometry, multiple flexures may be stacked to achieve the required stiffness, thus reducing manufacturing costs and any tolerancing issues, without affecting thermal sensitivity. The accelerometer is suitably designed to exhibit a radial symmetry. The accelerometer is suitably designed to use low CTE materials for at least the proof mass and body and a low thermal expansion differential Eddy current sensor head.

In an embodiment, the body is formed with a stepped internal cavity that defines first and second parallel mounting surfaces on opposite sides of the internal cavity but offset from the ends of the internal cavity. A first flexure assembly's mounting surface is attached to both the body's first parallel mounting surface and a mounting surface towards one end of the proof mass. A second flexure assembly's mounting surface is attached to both the body's second parallel mounting surface and a mounting surface towards the other end of the proof mass. As a result, the attachments of the body/flexure assembly/proof mass for each of the first and second flexure assemblies lie in two different transverse planes perpendicular to the axial displacement of the proof mass. The axial distance between attachment points for each flexure assembly is approximately zero. This minimizes (or eliminates) false accelerations due to temperature gradients.

In an embodiment, each flexure assembly comprises a vertical stack of multiple flexures to provide a specified stiffness. The attachments of the body/flexure assembly/proof mass remain in the same transverse plane, and thus do not affect the thermal stability of the accelerometer. The individual flexures are easier and less expensive to manufacture than a single flexure with the same specified stiffness.

In an embodiment, each Eddy current sensor head comprises a photolithographically defined single layer coil a few thousandths of an inch thick on a base. Because the sensor head is so thin, CTE effects are minimal Because the coil is photolithographically defined, there is minimal variance between the pair of sensor heads. The low CTE further reduces thermal expansion effects due to axial thermal gradients. The coils are suitably photolithographically defined on thin low-CTE carriers that are mounted on parallel mounting surfaces at opposite ends of the body about the axis in close proximity to the proof mass, or are photolithographically defined directly on the body. The ends of the proof mass suitably extend through the flexure assemblies to lie in close proximity to the sensor heads positioned at opposite ends of the body. The proof mass is stepped such that its mounting surfaces are offset from the ends to allow the ends to extend through the flexure assemblies.

In an embodiment, the accelerometer (body/flexures/proof mass) is designed to exhibit a radial symmetry in which the accelerometer has the same design and properties along any diameter. In other words, a location in the accelerometer has the same design and properties as a location 180 degrees from that location at the same distance from the axis. In different embodiments, the flexure assemblies may include a compliant disk or cross-shaped flexures. Radial symmetry reduces thermal expansion effects due to transverse thermal gradients.

In an embodiment, the accelerometer is implemented using materials with low CTE, less than 2 parts per million per degree C. (ppm/C.). In particular, the body and proof mass may be implemented with low CTE materials. Many standard low CTE materials do not provide the compliance necessary to implement the flexures. However, the flexures may be implemented using a composite material that exhibits a zero CTE.

In an embodiment, the accelerometer is implemented with a proof mass of at least 0.01 Kg and exhibits a bias <10 micro-g's and scale factor error less than 10 ppm without tight thermal control. By comparison, our thermally insensitive design provides 3× and 10× reductions in sensitivity to axial and transverse temperature gradient effects, respectively, as compared to the original design.

These and other features and advantages of the invention will be apparent to those skilled in the art from the following detailed description of preferred embodiments, taken together with the accompanying drawings, in which:

DETAILED DESCRIPTION OF THE INVENTION

Testing of Raytheon's open-loop hung mass accelerometer (described in U.S. Patent Publication US2014/0157897) and herein referred to as the "original design" revealed that tight thermal control of this original design was required to achieve desired bias stability and scale factor error performance. In particular, axial or transverse temperature gradients could produce false accelerations.

The present invention provides a thermally insensitive open-loop hung mass accelerometer that addresses thermal limitations of the original design. In different embodiments, the geometry of the body/flexures/proof mass attachments is changed so that thermal expansion effects due to thermal gradients across the accelerometer or bulk temperatures changes of one flexure relative to the other cause minimal or no axial displacement of the proof mass. In this geometry, multiple flexures may be stacked to achieve the required stiffness, thus reducing manufacturing costs and any tolerancing issues, without affecting thermal sensitivity. The accelerometer is suitably designed to exhibit a radial symmetry. The accelerometer is suitably designed to use low CTE materials for at least the proof mass and body and a low thermal expansion differential Eddy current sensor head.

Figure 1:
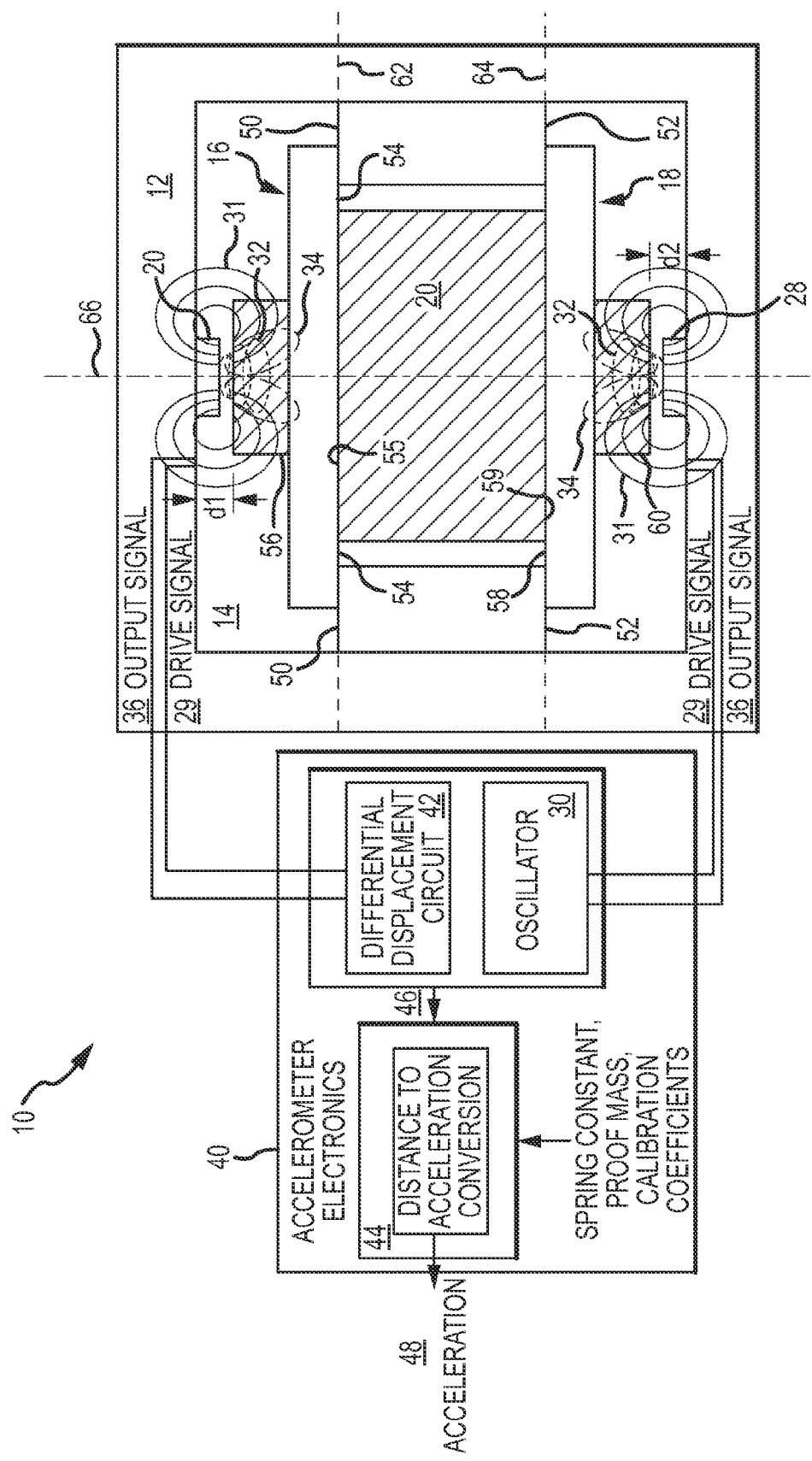
FIG. 1 is a schematic block diagram of a thermally insensitive open-loop hung mass accelerometer with differential Eddy current sensing.
Figure 2A:
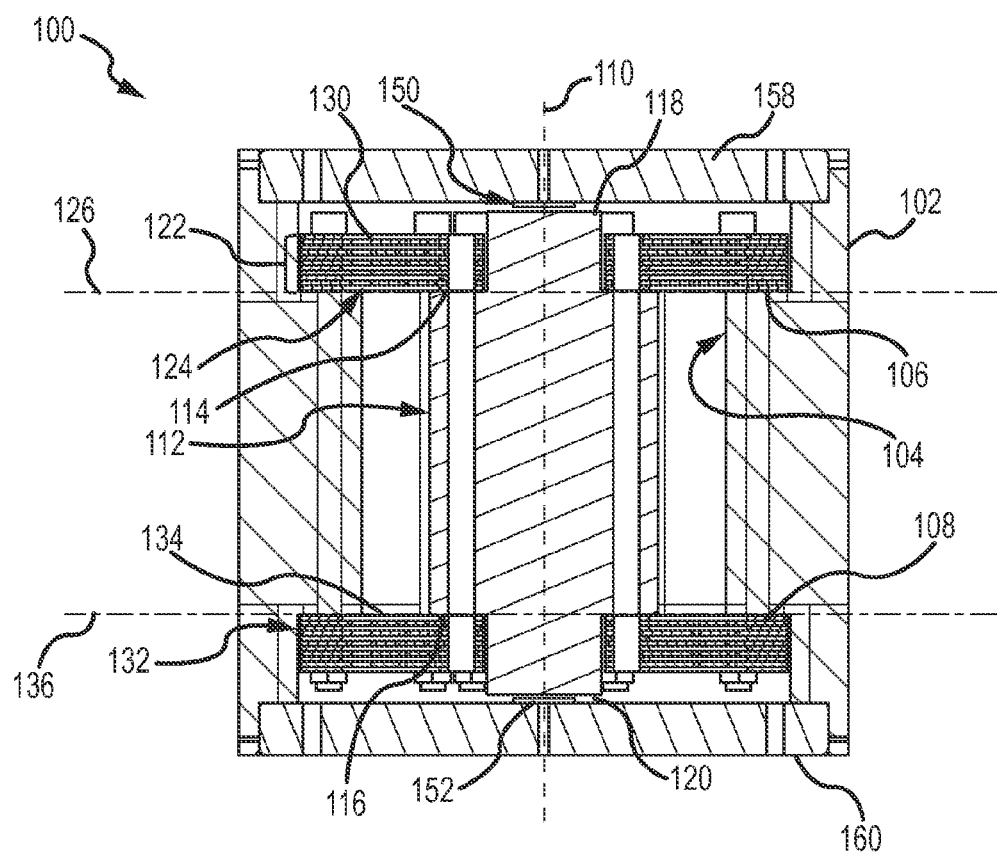
FIGS. 2a through 2d are different views of an embodiment of a thermally insensitive open-loop hung mass accelerometer sans the electronics.
Figure 2B:
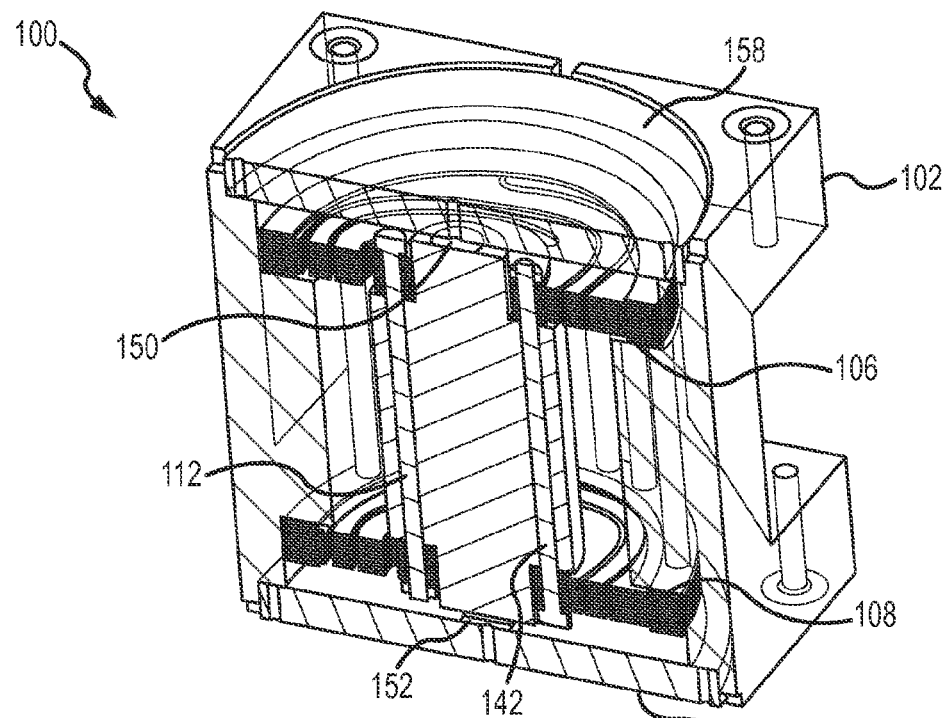
Figure 2C:
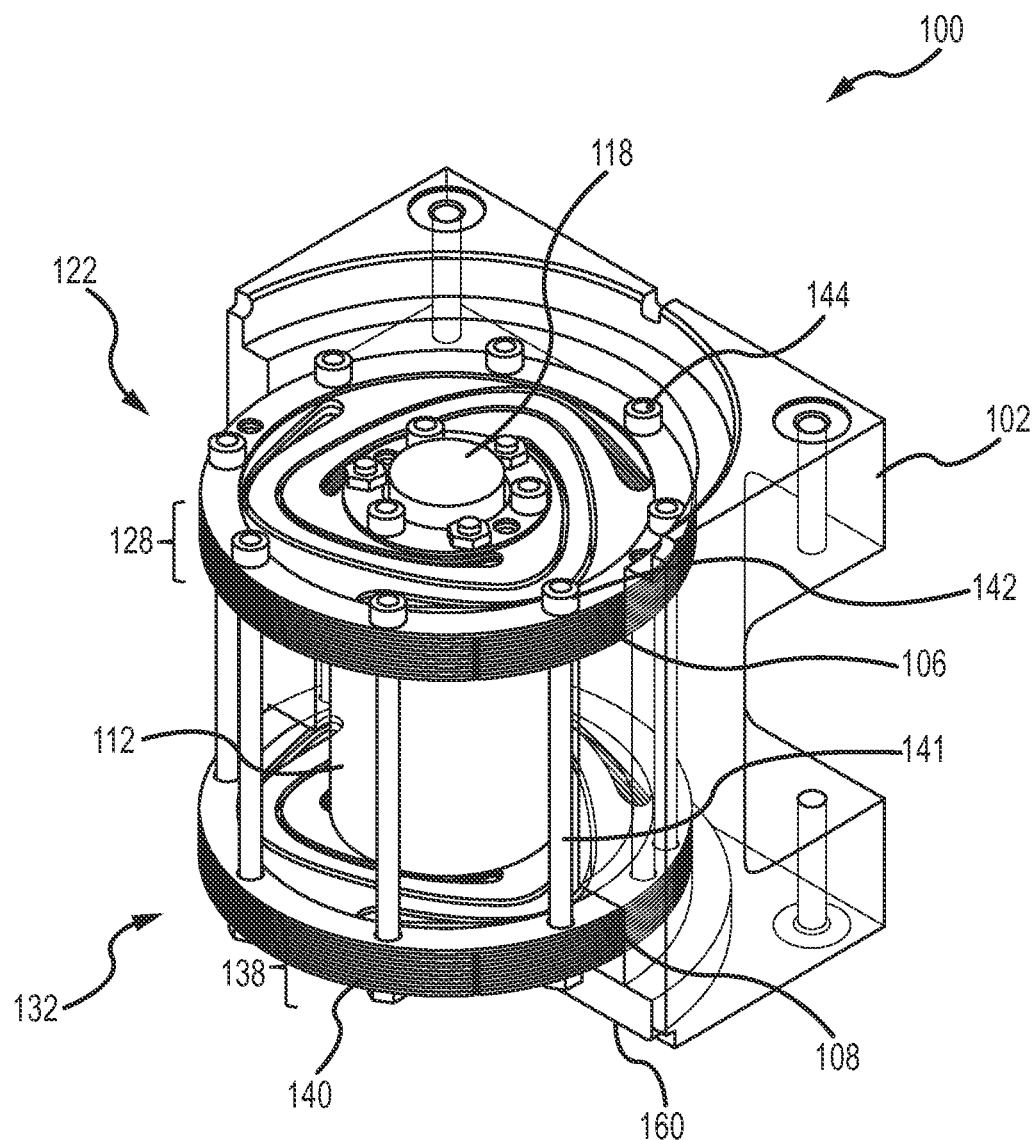
Figure 2D:
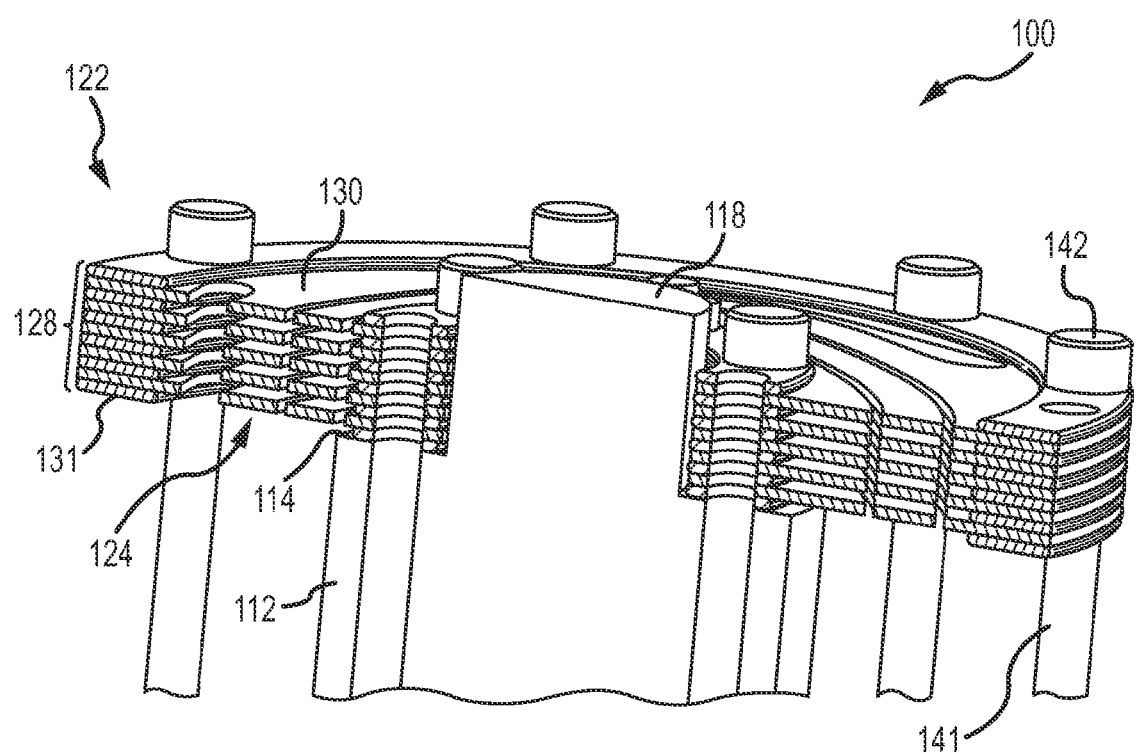

As shown in FIG. 1, an embodiment of a thermally insensitive open-loop hung mass accelerometer 10 comprises a body 12, first and second flexure assemblies 16 and 18 and a proof mass 20. Body 12 has a stepped internal cavity 14 that defines first and second parallel mounting surfaces 50 and 52 on opposite sides of the internal cavity but offset from the ends of the internal cavity. The first flexure assembly's mounting surface 54 is attached to both the body's first parallel mounting surface 50 and a mounting surface 55 towards one end 56 of proof mass 20. The second flexure assembly's mounting surface 58 is attached to both the body's second parallel mounting surface 52 and a mounting surface 59 towards the other end 60 of proof mass 20. As a result, the attachments of the body/flexure assembly/proof mass for each of the first and second flexure assemblies lie in different transverse planes 62 and 64 perpendicular to the axial displacement of proof mass 20 along an axis 66. The axial distance between attachment points for each flexure assembly is approximately zero. This minimizes (or eliminates) false accelerations due to temperature gradients First and second flexure assemblies 16 and 18 are attached to the body 12 on opposite sides of the internal cavity 14 in a collinear arrangement. Proof mass 20 is attached between the first and second flexure assemblies to hang inside the internal cavity. The proof mass is suitably at least 0.01 kg, and more typically about 0.1 kg. The proof mass is constrained to move in-line with the first and second flexure assemblies along axis 66. The two flexures assemblies have known, and suitably equal, stiffness. Each flexure assembly may include a single flexure or a vertical stack of multiple flexures to provide the specified stiffness. The attachments of the body/flexure assembly/proof mass remain in the transverse plane, and thus do not affect the thermal stability of the accelerometer. The individual flexures are easier and less expensive to manufacture than a single flexure with the same specified stiffness. The accelerometer is suitably configured to provide a dampening of the motion of the proof mass 20 to inhibit resonance. One of the flexure assemblies may include magnets to provide magnetic dampening. Alternatively, the accelerometer may be mounted on an isolation system to ensure it is not excited in a manner that causes the motion of the proof mass exceeds its travel limits at resonance.

The accelerometer is suitably configured to be very stiff in the other five degrees of freedom i.e. the other two axes orthogonal to axis 66 and the rotation around each of the three linear axes. For example, the flexures may have a stiffness that would allow displacement along axis 66 with a 100 Hz frequency whereas the stiffness in the other five degrees of freedom may limit any motion to around a 1 kHz frequency minimizing cross-coupling of the device. Essentially the accelerometer is configured to allow motion only along axis 66. An accelerometer may be provided for each of the three translations or a lesser subset thereof as required by a particular application.

The accelerometer (body/flexures/proof mass) is suitably designed to exhibit a radial symmetry in which the accelerometer has the same design and properties along any diameter passing through axis 66. In other words, a location in the accelerometer has the same design and properties as a location 180 degrees from that location at the same distance from the axis. In different embodiments, the flexure assemblies may include a compliant disk or cross-shaped flexures. Radial symmetry reduces thermal expansion effects due to transverse thermal gradients.

The accelerometer is suitably implemented using materials with low CTE, less than 2 parts per million per degree C. (ppm/C.). This would include many glasses, ceramics, carbon-fiber composites, and the ferrous metal alloy invar and its derivatives. Some sample materials include (but are not limited to): ULE (ultra low expansion) glass, Zerodur glass, quartz crystal, invar, super invar and graphite composites.

In particular, the body and proof mass may be implemented with low CTE materials. Many standard low CTE materials do not provide the compliance necessary to implement the flexures. However, the flexures may be implemented using a composite material that exhibits a zero CTE.

The accelerometer includes a differential Eddy current sensor to sense the displacement of the proof mass 20 along axis 66. The sensor comprises first and second sensor heads 26 and 28 positioned on the body 12 inside the internal cavity 14 on opposite sides of the proof mass 20 at distances d1 and d2 that increase and decrease in opposition as the proof mass moves along axis 66. The sensor heads may be positioned adjacent the flexures as shown or may be positioned within and collinear with the flexures. The proof mass 20 suitably has a stepped profile such that the ends 56 and 60 of the proof mass 20 extend through the flexure assemblies 16 and 18 proximate the sensor heads 26 and 28 at each end of the body 12.

Each sensor head includes a reference coil responsive to an alternating drive signal 29 from a common oscillator 30 to produce an oscillating magnetic field 31. In a preferred embodiment, each sensor head comprises a photolithographically defined single layer coil a few thousandths of an inch thick on a base. Because the sensor head is so thin, CTE effects are minimal Because the coil is photolithographically defined, there is minimal variance between the pair of sensor heads. The low CTE effects further reduces thermal expansion effects due to axial thermal gradients.

The magnetic field induces Eddy currents 32 in the proof mass 20 that create an opposing magnetic field 34 that resists the magnetic field 31 generated by the reference coil. The target surface on the proof mass should be at least three times larger than the diameter of the sensor head for normal, calibrated operation; otherwise, special calibration may be required. Any change in the distance (d1 or d2) between the reference coil and the proof mass due to a displacement d of the proof mass from a null position corresponding to no acceleration causes a change in the magnetic field interaction that alters an output signal 36. Typically, the output signal 36 is the drive signal 29 that has been altered in phase or amplitude by the field interaction.

If the proof mass 20 is closer the top sensor head 26 than the bottom sensor head 28, the Eddy currents due to the top sensor head 26 are larger in the proof mass than the Eddy currents due to the second sensor head 28 (which is further away). This in turn modifies the excitation in the top sensor head 26 more than the excitation in the bottom sensor head 28. The impedances seen by the sensor heads change differentially with the displacement of the proof mass. Consequently the output signals 36 are altered differentially. In an embodiment, output signals 36 are the drive signals 29 that have been differentially altered in phase or amplitude.

Accelerator electronics 40 comprise three functional blocks; oscillator 30, a differential displacement circuit 42 and a distance-to-acceleration conversion circuit 44. Oscillator 30 provides the common drive signal 29 to excite sensor heads 26 and 28. Differential displacement circuit 42 compares output signals 36 from sensor heads 26 and 28 to provide an output 46 proportional to the displacement d of the proof mass 20 along axis 66.

In an embodiment, differential displacement circuit 42 includes a tuned impedance (e.g. a series connected capacitor and resistor) that is connected in series with a reference coil of sensor head 1 26 to form a resonant circuit, a tuned impedance (e.g. a series connected capacitor and resistor) that is connected in series with a reference coil of sensor head 2 28 to form a resonant circuit, and an impedance change detector. The resonant circuits may be tuned to have the same or different resonant frequencies. In an embodiment, the resonant frequency of one circuit is slightly greater than the frequency of the drive current and the resonant frequency of the other circuit is slightly less than the frequency of the drive current.

When each reference coil is driven by the alternating drive current 29, an oscillating magnetic field is generated that induces Eddy currents in the proof mass 20. The Eddy currents induced in the proof mass circulate in Eddy current impedances represented by a parallel inductor and resistor connection in a direction to produce a secondary magnetic field opposite that of the reference coil, reducing the magnetic flux in the reference coil and thereby the reference coil inductance. The Eddy currents also dissipate energy, increasing the reference coil's effective resistance.

The reference coil constitutes the primary and the proof mass the (shorted) secondary of a weakly coupled air-core transformer. Displacement of the proof mass changes the coupling, and this displacement is reflected as an impedance change at the terminals of the reference coil, which in turn produces an altered drive current 36 As the proof mass approaches the reference coil, the inductance goes down and the reflected resistance increases. By electronically comparing the impedance changes in the two altered sensor head drive currents (such as amplitude and/or phase changes), the relative displacement between the two sensor heads can be determined accurately.

Output 46 may be a voltage or current signal that represents a change in impedance measured as a phase or amplitude of the output signal (e.g. altered drive signal) proportional to the displacement d. Knowing the mass of the proof mass, the spring constant (stiffness of the flexures) and any calibration coefficients, distance-to-acceleration circuit 44 converts output 46 to an acceleration 48 of the proof mass. These two functional circuits may, for example, be separate analog and digital circuits or may, for example, be a single circuit in which case output 46 may be an internal parameter.

Either the differential displacement circuit 42 or the distance-to-acceleration circuit 44 may perform an intermediate step of converting output 46 to a displacement d. As shown, the distance-to-acceleration circuit performs the conversion. For a given sensor head, $Lsnr(d/r)=Ls*(1-K e^{-A(d/r)})$ where d is the coil to proof mass spacing, Lsnr is the total sensor inductance (nominal plus Eddy current induced), Ls is the reference coil inductance when the proof mass is infinitely far away (d=infinity), K=0.5 to 0.75 (for typical proof mass materials), A is a constant depending on the proof mass material and r is the reference coil winding radius. Similarly, the total sensor resistance is $Rsnr(d/r)=Rs*(1+C e^{-B(d/r)})$ where B and C are constants depending on the proof mass material and B>A and C<K. The relative increase in inductance is more significant than the decrease in reflected resistance for increasing d. Thus, the change in the reference coil inductance is the basis for Eddy current sensing. The differential phase or amplitude from output 46 is mapped to a change in differential impedance. This change in impedance is related to the distance d through the above equations.

Once displacement d is known, Hooke's law can infer the force F operating on the spring, i.e. F=kd, where k is the spring constant. Once the force F is known, acceleration is determined through Newton's Law F=Ma, where M is the mass of the proof mass. As previously discussed, Hooke's Law assumes that the spring constant k is in fact constant over the possible displacement range, which strictly speaking is not true at the levels of performance required for strategic grade performance. In addition, the sensor itself has nonlinearities due to non-perfect electronics and sometimes the physics of the sensing mechanism. The differential topology of the Eddy current sensor heads has the advantage that when the proof mass is far from one sensor head it is simultaneously close to the other sensor head. Consequently, without any further compensation the system output is more linear. Furthermore, it is simpler to remove any remaining non-linearity of both the spring constant as well as the sensor through calibration and the application of calibration coefficients to compute the displacement or acceleration. Owing to the thermal stability and linearity of the differential Eddy current sensor, the acceleration 48 is substantially linear with the displacement d of the proof mass over a specified range of motion.

Referring now to FIGS. 2a through 2d, an embodiment of a thermally insensitive open-loop hung mass accelerometer 100 sans the accelerometer electronics comprises a body 102 having a stepped internal cavity 104 that defines first and second parallel mounting surfaces 106 and 108 perpendicular to an axis 110 on opposite sides of the internal cavity but offset from the ends of the internal cavity. A proof mass 112, suitably at least 0.01 kg, has a stepped profiled that defines third and fourth parallel mounting surfaces 114 and 116 offset from opposite ends 118 and 120 of the proof mass.

Figure 6A:
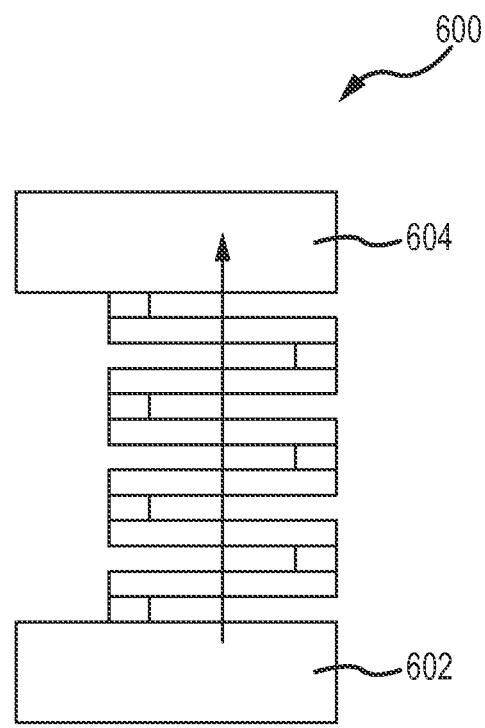
FIGS. 6a and 6b are views of the flexures used in the original and new designs, respectively.

A first flexure assembly 122 has a fifth mounting surface 124 that is attached to both the body's first parallel mounting surface 106 and the proof mass' third parallel mounting surface 114 at different transverse locations in approximately a first transverse plane 126 perpendicular to the axis 110. The first flexure assembly comprises a stack 128 of multiple disks (flexures) 130 each compliant along the axis. The disks 130 are suitably separated by spacers 131 to prevent the disks from rubbing against each other as the proof mass moves along the axis. Designing each disk with less stiffness than needed and stacking them to increase the total stiffness to a specified value simplifies and reduces the cost of manufacturing. Since the stack of flexures are equivalent to springs in parallel, adding additional flexures increases the overall stiffness by simple addition (this is equivalent to adding resistors in series to an electric circuit). If the springs were instead in series (as shown in FIG. 6a) adding additional flexures would decrease the overall stiffness (equivalent to adding resistors in parallel to an electric circuit). Because the stack attaches the proof mass to the body in the transverse plane the sensitivity to axial temperature gradients is not effected. Using multiple disks within the stack tends to cancel any random manufacturing variations. The end 118 of the proof mass extends through the stack of compliant disks.

A second flexure assembly 132 has a sixth mounting surface 134 that is attached to both the body's second parallel mounting surface 108 and the proof mass' fourth parallel mounting surface 116 at different transverse locations in approximately a second transverse plane 136 perpendicular to the axis 110. The second flexure assembly comprises a stack 138 of multiple disks 140 (separated by spacers) each compliant along the axis 110. The end 120 of the proof mass extends through the stack of compliant disks.

The attachments of the body/flexure assembly/proof mass for each of the first and second flexure assemblies lie in two different transverse planes perpendicular to the axial displacement of the proof mass. The axial distance between attachment points for each flexure assembly is approximately zero. This minimizes (or eliminates) false accelerations due to axial temperature gradients.

The pair of flexure assemblies constrain the proof mass to move in an axial direction along the axis 110 at a resonance of ~100 Hz in an open-loop configuration (no feedback control). The body restricts movement in the non-compliant directions orthogonal to axis 110 or in rotation about any of the axes to reduce unwanted cross coupling of transverse accelerations into the main sensing axis. These other modes are all >~10 times the frequency of the compliant direction (in this case 100 Hz) and do not nominally result in sensed motion.

In this embodiment, the first and third parallel mounting surfaces 106 and 114 are concentric first and second annular surfaces about the axis 110 that lie in the first transverse plane 126 and said second and fourth parallel mounting surfaces 108 and 116 are concentric third and fourth annular surfaces about the axis that lie in the second transverse plane 136.

In this embodiment, the flexure assemblies are attached to the body and the proof mass using nuts and bolts. A first plurality of bolts 141 positioned around the periphery extends through the first stack of compliant disks, the body and the second stack of compliant disks. A like plurality of nuts 142 are threaded onto bolts 141 to sandwich the body between the flexure assemblies to attach the disks to the body. A second plurality of bolts 144 positioned around the interior extends through the first stack of compliant disks, the body and the second stack of compliant disks. A like plurality of nuts 146 are threaded onto bolts 144 to sandwich the proof mass between the flexure assemblies to attach the disks to the proof mass. Different mechanisms may be used to attach the flexure assemblies to the body and proof mass in the described transverse attachment geometry. First and second sensor heads 150 and 152 are positioned on opposite ends of the body along axis 110 on opposite sides of the proof mass 112 at distances d1 and d2 that increase and decrease in opposition as the proof mass moves along the axis. Each sensor head has a photolithographically defined single layer reference coil responsive to an alternating drive signal to produce an oscillating primary magnetic field that induces Eddy currents in the proof mass that create an opposing secondary magnetic field that resists the primary magnetic field generated by the reference coil. Any change in the distance between the reference coil and the proof mass causes a change in the magnetic field interaction that produces differential alterations to the alternating drive signal. The single layer reference coil may be photolithographically defined directly on an end cap 158 or 160 that is assembled to form the body or may be defined on a thin low CTE carrier that is attached to the end of the body inside the internal cavity. The low CTE sensor head reduces sensitivity to axial temperature gradients.

At least the body and the proof mass are suitably formed of materials having a coefficient of thermal expansion (CTE) less than two parts per million per degree C. This would include many glasses, ceramics, carbon-fiber composites, and the ferrous metal alloy invar and its derivatives. Some sample materials include (but are not limited to): ULE (ultra low expansion) glass, Zerodur glass, quartz crystal, invar, and super invar. Most of these materials are not suitable for forming the flexures as they are typically too rigid. The flexures may be formed from materials such as aluminum that have a CTE greater than 2 ppm/C°. Alternately, the flexures may be formed from a carbon-fiber composite material that exhibits a CTE of near zero. The low CTE materials reduce sensitivity to transverse thermal temperature gradients.

The accelerometer exhibits radial symmetry about axis 110. The structural and thermal expansion properties of the entire accelerometer; the body, flexure assemblies, proof mass and sensor heads are the same at any location in the accelerometer and a location 180 degrees from that location. Radial symmetry reduces sensitivity to transverse thermal temperature gradients.

The accelerometer has a measured acceleration with a bias less than 10 micro-g's and a scale factor error less than 10 parts per million in an environment in which temperature gradients are less than 10 milli Kelvin.

FIGS. 3a-3b, 4a-4b, 5a-5b, 6a-6b, 7a-7b and 8a-8b compare symmetry, attachment geometry, sensor head design, flexure assembly design, sensitivity to axial temperature gradient and sensitivity to transverse temperature of the original design and the current thermally insensitive design.

Figure 3B:
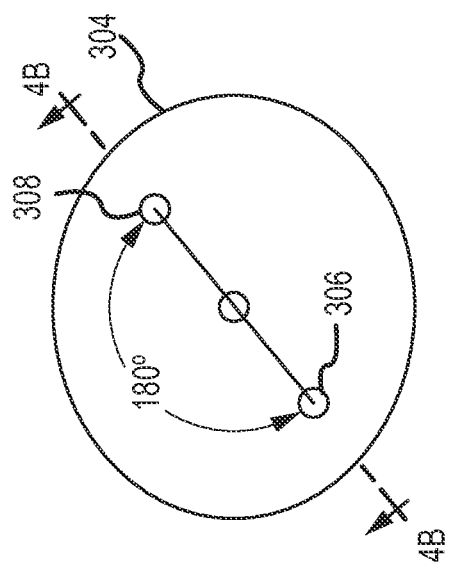
FIGS. 3a and 3b are plan views of the original and new designs of the hung mass accelerometer illustrating their respective symmetries.
Figure 3A:
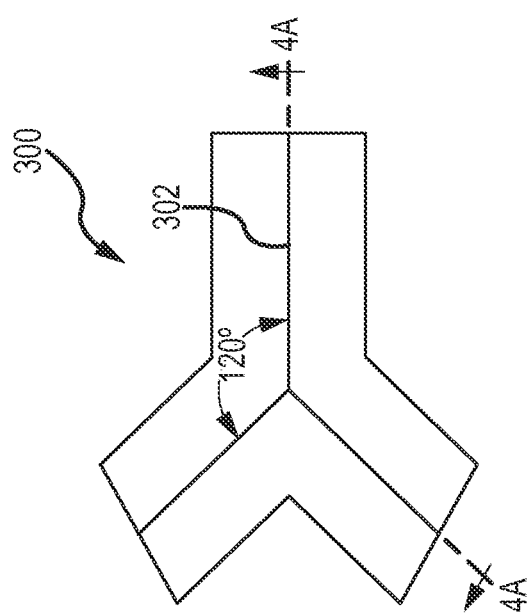

Referring now to FIGS. 3a and 3b, the original design has a 3-legged geometry 300 in which the 3 flexures 302 are spaced at 120 degree intervals. This geometry is not radially symmetric. A location 180 degrees from any position on a flexure does not lie on a similar flexure. Thus neither the structural or thermal expansion properties will exhibit radial symmetry. As shown in FIG. 4, the current design has a circular geometry 304 exhibit by the sensor heads, proof mass, flexure assemblies and body. This geometry is radially symmetric. A location 306 180 degrees from any position 308 within the accelerometer (same distance from the axis) exhibits the same structural and thermal expansion characteristics. Another example would be a cross "+" geometry, either for all components or just the flexure assemblies that would be radially symmetric. Radial symmetry reduces sensitivity to transverse temperature gradients as follows: A transverse gradient causes one side of the assembly (the side with the higher temperature) to grow in axial length and the other side (with the lower temperature) to decrease in axial length. If the geometry on both sides of the assembly is the same (i.e., radially symmetric), the amount of (or distance of) increase in axial length on one side is the same as the decrease in axial length on the other side. The net effect of this is that the center of the accelerometer (which is where the sensor head measures a displacement) does not change in length because the change in one side is exactly canceled by the change in the other side.

Figure 4A:
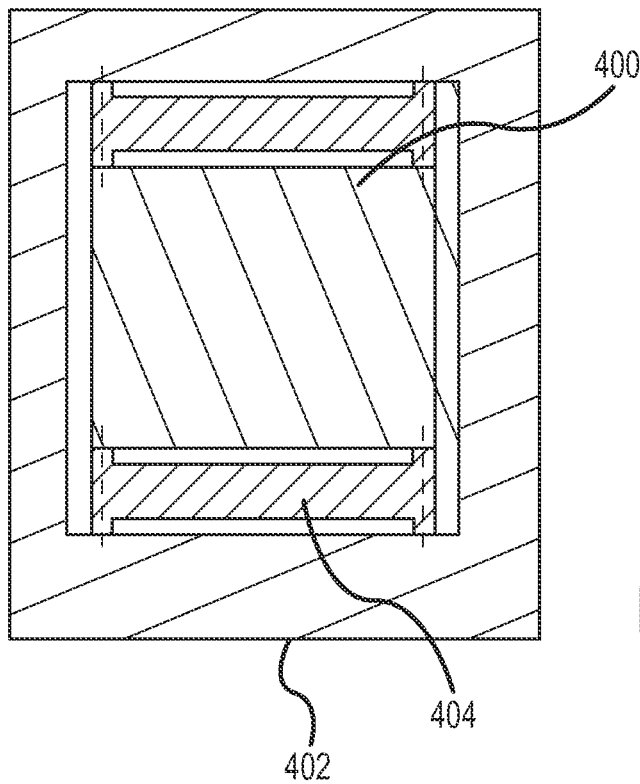
FIGS. 4a and 4b are illustrations of the attachment geometry of the body/flexures/proof mass for the original and new designs of the hung mass accelerometer.
Figure 4B:
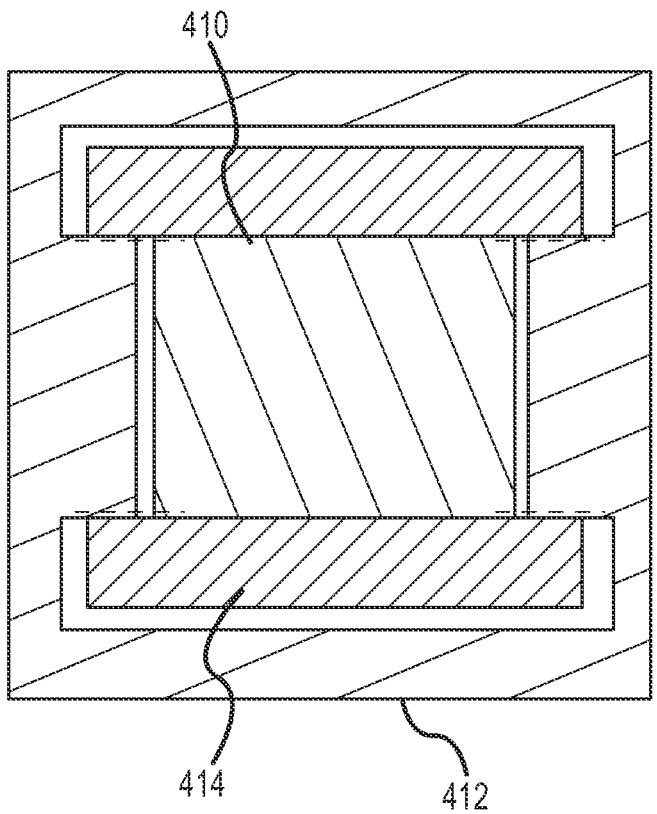

Referring now to FIGS. 4a and 4b, the original design for the accelerometer comprises a proof-mass 400 connected to the accelerometer body 402 with a flexure 404 at each of two ends. Under the influence of gravity or any other acceleration, the proof-mass moves relative to the body in a straight line along the axis of the accelerometer—this direction of movement defines the "axial direction" of the accelerometer. The two directions perpendicular to this axis are the "transverse directions." In the original design, the flexures 404 are placed such that the body 402, the flexures 404, and the proof-mass 402 are connected to each other along the axial direction. In other words, the connection between the body, proof-mass, and flexures occur at the same locations in the two transverse directions, but at different locations in the axial direction.

The new design for the accelerometer comprises a proof-mass 410 connected to the accelerometer body 412 with a flexure 414 at each of two ends. Under the influence of gravity or any other acceleration, the proof-mass moves relative to the body in a straight line along the axis of the accelerometer—this direction of movement defines the "axial direction" of the accelerometer. The two directions perpendicular to this axis are the "transverse directions." In the new accelerometer design, the flexures 414 are placed such that the body 412, the flexures 414, and the proof-mass 410 are connected to each other along the transverse directions. In other words, the connection between the body, proof-mass, and flexures occur at the same location in the axial direction, but at different locations in the transverse directions.

The effect of this change is that, in the new design, if the flexures 414 experience a differential change in length along the axial direction (due to a thermal gradient), the proof mass 410 is not displaced. In the original design, if the flexures 404 experience a differential change in length along the axial direction (due to a thermal gradient), the proof mass 400 is displaced. This change means that the new design is less sensitive to thermal gradients along the axial direction. This means that to achieve the same performance, the new design requires less stringent thermal control. In addition, the new design can use a wider range of flexure designs—i.e. flexures that experience larger axial changes in length over temperature (higher coefficient of thermal expansion and/or greater axial length).

Figure 5A:
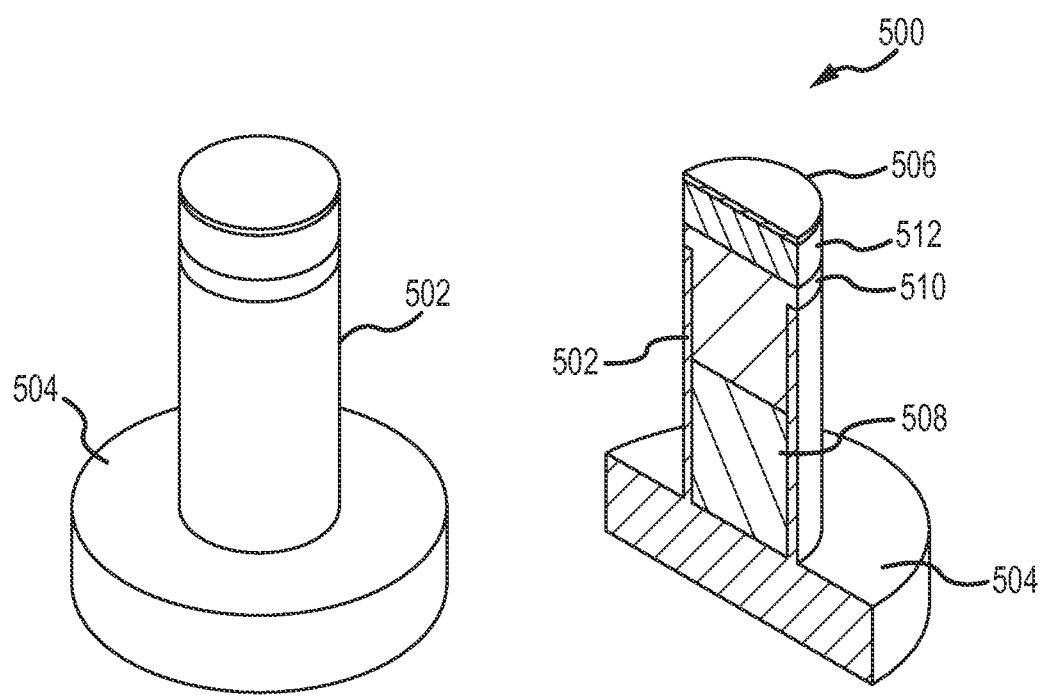
FIGS. 5a and 5b are diagrams of the sensor heads used in the original and new designs, respectively.
Figure 5B:
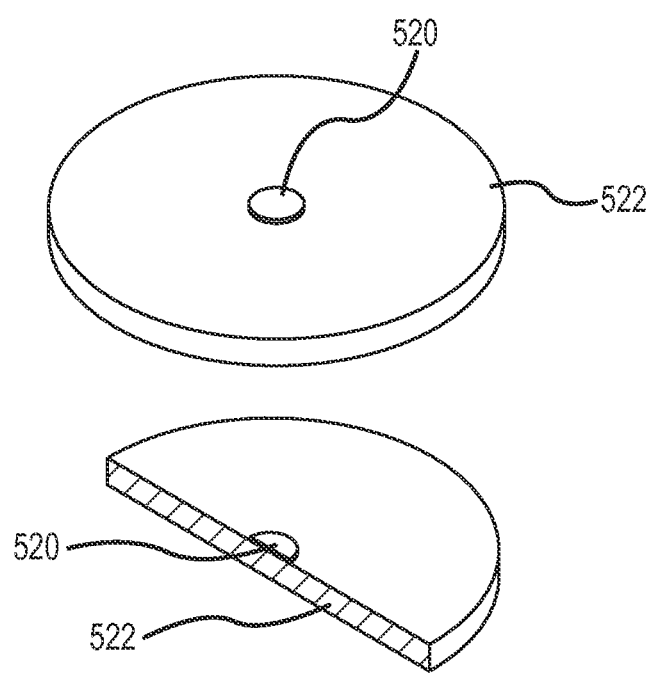

Referring now to FIGS. 5a and 5b, the original design for the accelerometer comprises a sensor head 500 that must extend through a hole in the body and through the flexure to access the proof mass. The sensor head 500 comprises a hollow stainless steel cylinder 502, typically 0.25 to 0.5 inches in length, on a base 504. At the end of the cylinder is a coil of copper wire 506. Between the copper coil and the base (0.25 to 0.5 inches away) are: the steel cylinder 502, G10, and various epoxies 508, 510 and 512. None of these materials is low CTE. In addition, the epoxies are subject to manufacturing tolerances—that is each sensor head has a different amount of these materials and thus each sensor head has a different CTE.

The new design is a single-layer coil of wire 520 a few thousands of an inch thick (<0.01 inches thick) that is defined with a photolithography process (similar to printed circuits). Because the sensor head is so thin, CTE effects are minimal (change in length=CTE * change in temperature*length (i.e., thickness)). Also, because the sensor head is made with a photolithography process instead of being a hand-wound coil of copper glued together with varying amount of (high-CTE) epoxy the CTE is uniform for each of the two sensor heads. The single-layer coil of wire 520 may be photolithographically defined directly on an end cap 522 that is assembled to form the body or on a thin low CTE carrier that is attached to the end of the body.

Figure 6B:
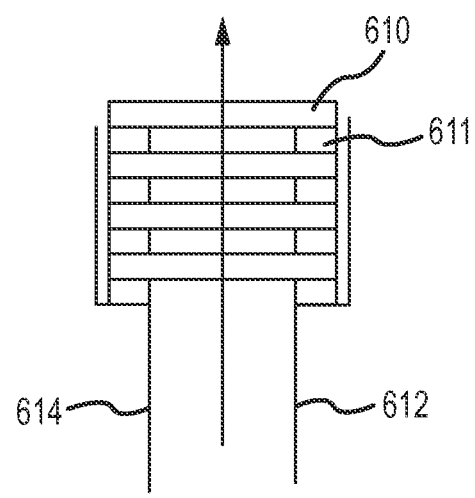

Referring now to FIGS. 6a and 6b, in the original design for the accelerometer each flexure assembly includes three flexures 600 spaced at 120 degree intervals around the axis. Each flexure 600 connects a proof mass 602 to a body 604 in the axial direction. To achieve a designed stiffness, the flexure has a given length in the axial direction (number of turns) and material thickness. The thicker the material the stiffer the flexure. The greater the number of terms (longer the flexure) the more compliant the flexure. It is easier, cheaper and more reproducible to manufacture a flexure with more and thicker turns. However, doing so increases the axial length of the flexure, which makes the accelerometer more susceptible to axial temperature gradients.

As shown in FIG. 6b, in the new design each flexure assembly may include a stack of one or more flexures 610 (separated by spacers 611). The stack connects a proof mass 612 to a body 614 in the transverse direction. The mounting surfaces/locations do not change—the proof mass, flexure assembly and housing still mounting along a transverse plane at the same axial location. Therefore, the manufacturing benefits of implementing a stack of flexures can be realized without negatively affecting the thermal sensitivity.

Figure 7A:
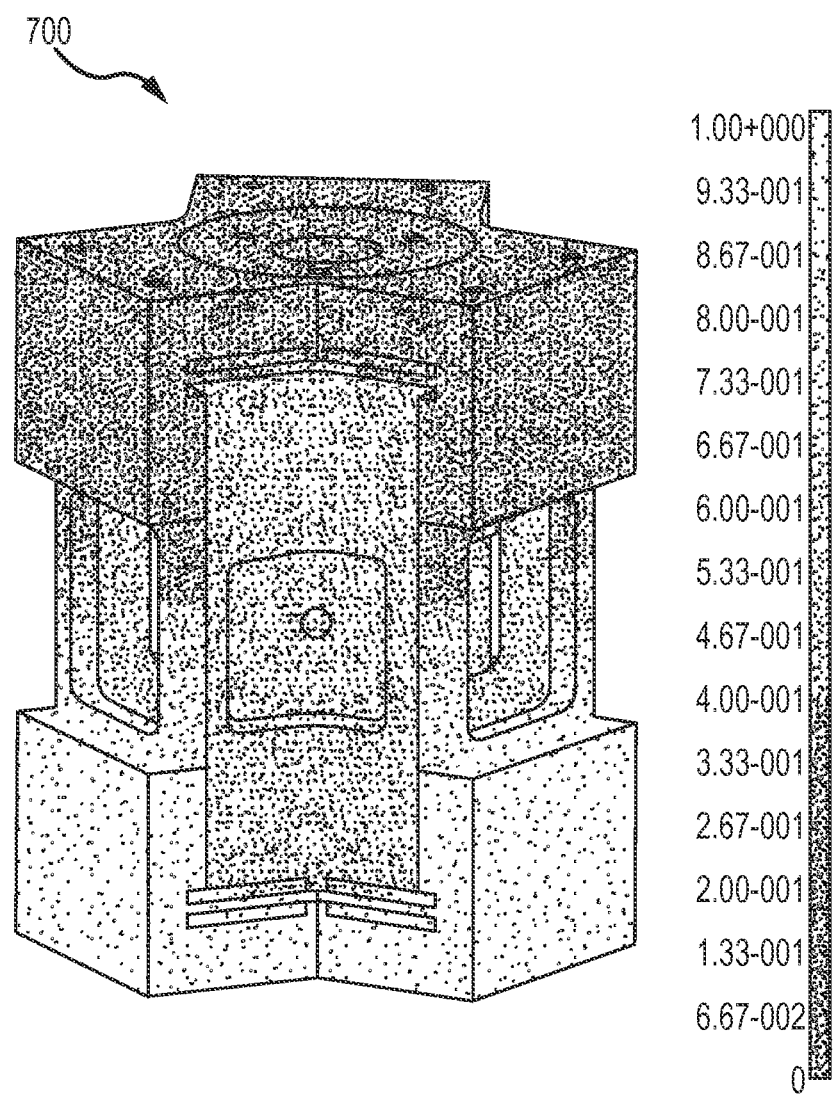
FIGS. 7a and 7b are diagrams illustrating the application of an axial temperature gradient to the original and new designs, respectively.
Figure 7B:
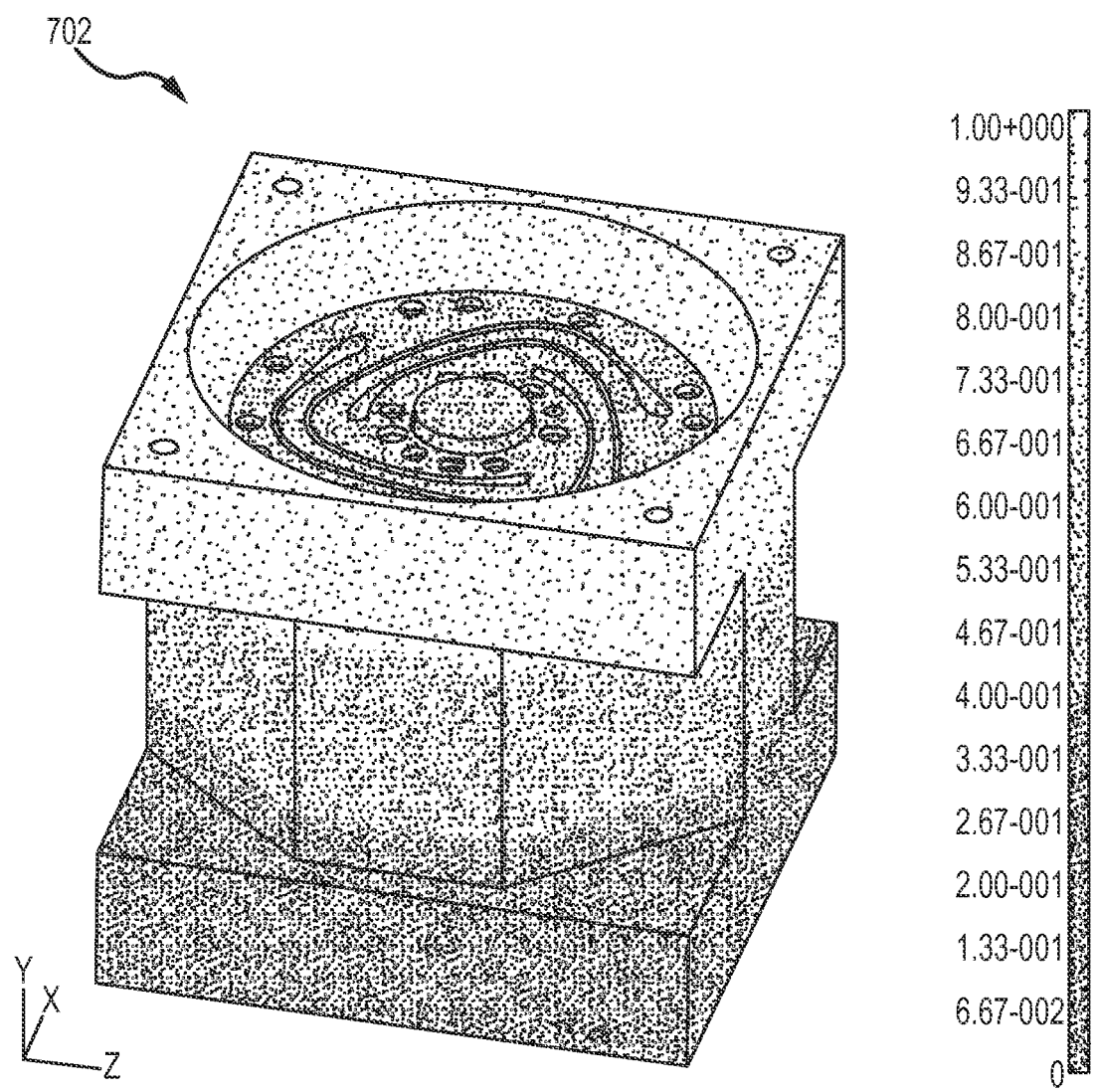

Referring now to FIGS. 7a and 7b, an axial temperature gradient of 1 degree Kelvin is applied across an accelerometer 700 of the original design and accelerometer 702 of the design depicted in FIGS. 2a-2d (cap removed for clarity).

The original design recorded a perceived acceleration for a 1K gradient of $4.33^{e-3}$ G. The new design recorded a perceived acceleration for a 1K gradient of $1.46e^-$G, which represents a 3×reduction in axial temperature gradient effects.

Figure 8A:
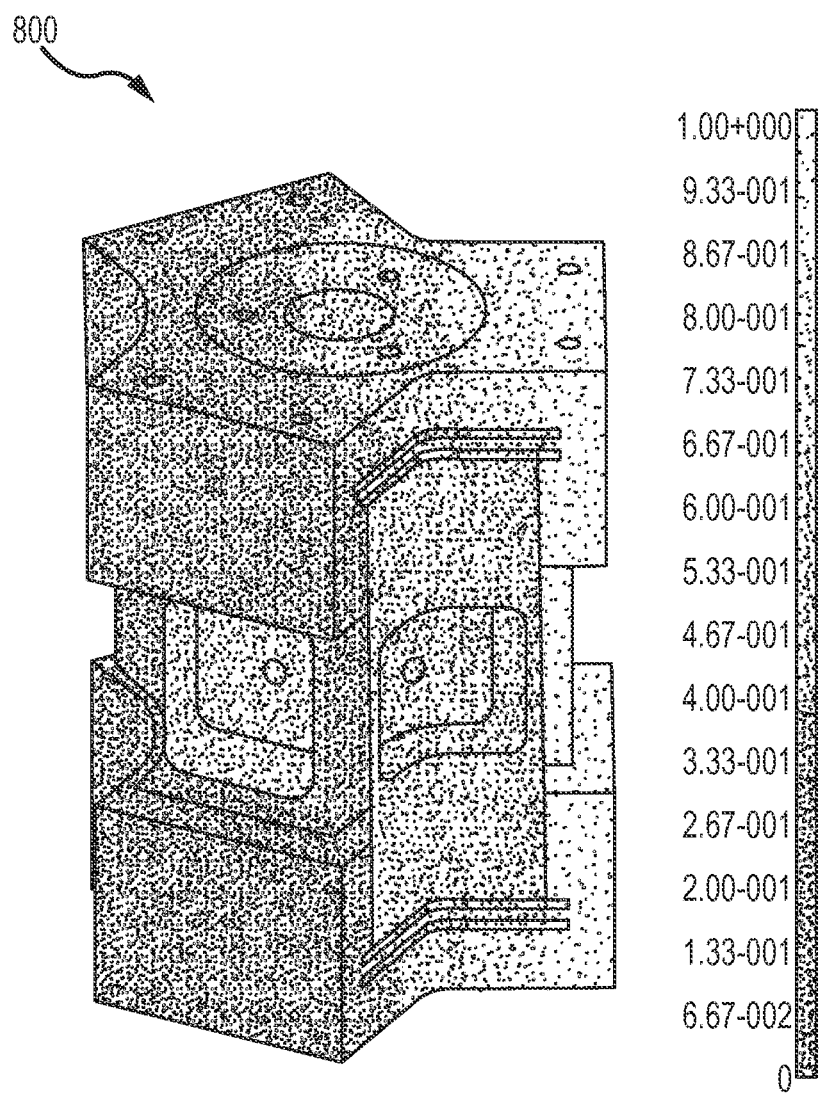
FIGS. 8a and 8b are diagrams illustrating the application of a transverse temperature gradient to the original and new designs, respectively.
Figure 8B:
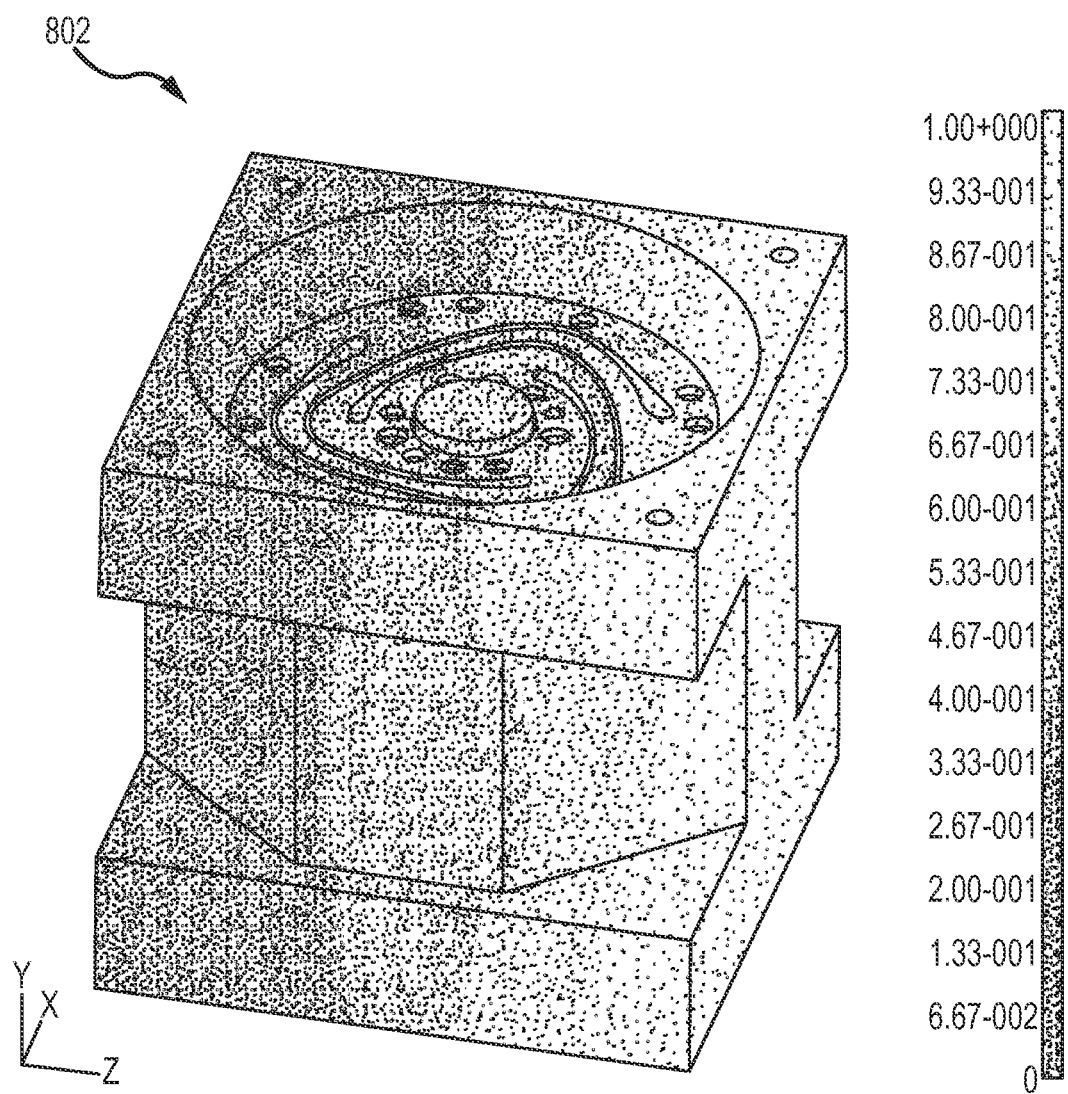

Referring now to FIGS. 8a and 8b, a transverse temperature gradient of 1 degree Kelvin is applied across an accelerometer 800 of the original design and accelerometer 802 of the design depicted in FIGS. 2a-2d (cap removed for clarity). The original design recorded a perceived acceleration for a 1K gradient of $1.39^{e-3}$ G. The new design recorded a perceived acceleration for a 1K gradient of $1.40e^{-4}$ G, which represents a 10× reduction in axial temperature gradient effects.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A hung mass accelerometer, comprising:
   a body having a stepped internal cavity that defines first and second parallel mounting surfaces perpendicular to an axis on opposite sides of the internal cavity but offset from the ends of the internal cavity;
   a proof mass having third and fourth parallel mounting surfaces towards opposite ends of the proof mass;
   a first flexure assembly having a fifth mounting surface that is attached to both the body's first parallel mounting surface and the proof mass' third parallel mounting surface at different transverse locations in approximately a first transverse plane perpendicular to the axis;
   a second flexure assembly having a sixth mounting surface that is attached to both the body's second parallel mounting surface and the proof mass' fourth parallel mounting surface at different transverse locations in approximately a second transverse plane perpendicular to the axis, said proof mass constrained to move in an axial direction along the axis in an open-loop configuration; and
   first and second sensor heads positioned along the axis on opposite sides of the proof mass at distances d1 and d2 that increase and decrease in opposition as said proof mass moves along the axis, each said sensor head having a reference coil responsive to an alternating drive signal to produce an oscillating primary magnetic field that induces Eddy currents in the proof mass that create an opposing secondary magnetic field that resists the primary magnetic field generated by the reference coil, any change in the distance between the reference coil and the proof mass causing a change in the magnetic field interaction that produces differential alterations to the alternating drive signal.

2. The hung mass accelerometer of claim 1, wherein said first and third parallel mounting surfaces are concentric first and second annular surfaces about the axis that lie in the first transverse plane and said second and fourth parallel mounting surfaces are concentric third and fourth annular surfaces about the axis that lie in the second transverse plane.

3. The hung mass accelerometer of claim 2, wherein said first and second flexure assemblies comprise first and second compliant disks, respectively, that attach to the concentric annular surfaces.

4. The hung mass accelerometer of claim 3, further comprising:
   a first plurality of bolts positioned around the periphery that extends through the first compliant disk, the body and the second compliant disk to attach the disks to the body; and
   a second plurality of bolts positioned around the interior that extends through the first compliant disk, the body and the second compliant disk to attach the disks to the proof mass.

5. The hung mass accelerometer of claim 2, wherein the proof mass has a stepped profile that defines the second and fourth annular surfaces offset from opposite ends of the proof mass such that the ends extend through said first and second flexure assemblies.

6. The hung mass accelerometer of claim 1, wherein said first and second sensor heads each comprise a photolithographically defined single layer reference coil attached at opposite ends of the body, wherein the ends of the proof mass extend through said first and second flexure assemblies along the axis at distances d1 and d2 to the sensor heads.

7. The hung mass accelerometer of claim 1, wherein each of said first and second flexure assemblies comprises a stack of multiple flexures each compliant along the axis.

8. The hung mass accelerometer of claim 7, wherein the multiple flexures in each stack are randomly aligned about the axis.

9. The hung mass accelerometer of claim 1, wherein said accelerometer exhibits radial symmetry about said axis in which the structure and CTE of the body, flexure assemblies, proof mass and sensor heads are the same at any location in the accelerometer and a location 180 degrees from that location.

10. The hung mass accelerometer of claim 1, wherein at least said body and said proof mass are formed of materials having a coefficient of thermal expansion (CTE) less than two parts per million per degree C.

11. The hung mass accelerometer of claim 10, wherein said flexure assemblies are formed of materials having a CTE greater than two parts per million per degree C.

12. The hung mass accelerometer of claim 10, wherein said flexure assemblies are formed of a composite material having a CTE of approximately 0 parts per million per degree C.

13. The hung mass accelerometer of claim 1, wherein the proof mass has a mass of at least 0.01 kg and the measured acceleration has a bias less than 10 micro-g's and a scale factor error less than 10 parts per million in an environment in which temperature gradients are less than 10 milli Kelvin.

14. The hung mass accelerometer of claim 1, further comprising electronics including
an oscillator that generates the alternating drive signal;
a first electrical circuit configured to compare the altered drive signals from the first and second sensor heads to provide an output proportional to the displacement of the proof mass along the axis; and
a second electrical circuit configured to convert the output to a measured acceleration of the body knowing the mass of the proof mass and the stiffness of the first and second flexure assemblies.

15. A hung mass accelerometer, comprising:
a body having an internal cavity;
first and second flexure assemblies attached to the body inside the internal cavity, said flexure assemblies compliant along an axis;
a proof mass attached between the first and second flexure assemblies to hang inside the internal cavity, said proof mass constrained to move in an axial direction along the axis in an open-loop configuration; and
first and second sensor heads positioned along the axis on opposite sides of the proof mass at distances d1 and d2 that increase and decrease in opposition as said proof mass moves along the axis, each said sensor head having a reference coil responsive to an alternating drive signal to produce an oscillating primary magnetic field that induces Eddy currents in the proof mass that create an opposing secondary magnetic field that resists the primary magnetic field generated by the reference coil, any change in the distance between the reference coil and the proof mass causing a change in the magnetic field interaction that produces differential alterations to the alternating drive signal.
wherein at least said body and said proof mass are formed of materials having a coefficient of thermal expansion (CTE) less than two parts per million per degree C.,
wherein said accelerometer exhibits radial symmetry about said axis in which the structure and CTE of the body, flexure assemblies, proof mass and sensor heads are the same at any location in the accelerometer and a location 180 degrees from that location.

16. A hung mass accelerometer, comprising:
a body having a stepped internal cavity that defines first and second parallel mounting surfaces perpendicular to an axis on opposite sides of the internal cavity but offset from the ends of the internal cavity;
a proof mass having a stepped profile that defines third and fourth parallel mounting surfaces offset from opposite ends of the proof mass;
a first flexure assembly having a fifth mounting surface that is attached to both the body's first parallel mounting surface and the proof mass' third parallel mounting surface at different transverse locations in approximately a first transverse plane perpendicular to the axis, said first flexure assembly comprising a stack of multiple disks each compliant along the axis, one end of said proof mass extending through the stack of compliant disks;
a second flexure assembly having a sixth mounting surface that is attached to both the body's second parallel mounting surface and the proof mass' fourth parallel mounting surface at different transverse locations in approximately a second transverse plane perpendicular to the axis, said second flexure assembly comprising a stack of multiple disks each compliant along the axis, the opposite end of said proof mass extending through said stack of compliant disks, said proof mass constrained to move in an axial direction along the axis in an open-loop configuration; and
first and second sensor heads positioned on opposite ends of the body along the axis on opposite sides of the proof mass at distances d1 and d2 that increase and decrease in opposition as said proof mass moves along the axis, each said sensor head having a photolithographically defined single layer reference coil responsive to an alternating drive signal to produce an oscillating primary magnetic field that induces Eddy currents in the proof mass that create an opposing secondary magnetic field that resists the primary magnetic field generated by the reference coil, any change in the distance between the reference coil and the proof mass causing a change in the magnetic field interaction that produces differential alterations to the alternating drive signal,
wherein at least said body and said proof mass are formed of materials having a coefficient of thermal expansion (CTE) less than two parts per million per degree C.,
wherein said accelerometer exhibits radial symmetry about said axis in which the structure and CTE of the body, flexure assemblies, proof mass and sensor heads are the same at any location in the accelerometer and a location 180 degrees from that location.

17. The hung mass accelerometer of claim 16, wherein said first and third parallel mounting surfaces are concentric first and second annular surfaces about the axis that lie in the first transverse plane and said second and fourth parallel mounting surfaces are concentric third and fourth annular surfaces about the axis that lie in the second transverse plane.

18. The hung mass accelerometer of claim 16, further comprising:
a first plurality of bolts positioned around the periphery that extend through the first stack of compliant disks, the body and the second stack of compliant disks to attach the disks to the body; and
a second plurality of bolts positioned around the interior that extend through the first stack of compliant disks, the body and the second stack of compliant disks to attach the disks to the proof mass.

19. The hung mass accelerometer of claim 16, wherein the proof mass has a mass of at least 0.01 kg and the measured acceleration has a bias less than 10 micro-g's and a scale factor error less than 10 parts per million in an environment in which temperature gradients are less than 10 milli Kelvin.

20. The hung mass accelerometer of claim 16, further comprising electronics including
- an oscillator that generates the alternating drive signal;
- a first electrical circuit configured to compare the altered drive signals from the first and second sensor heads to provide an output proportional to the displacement of the proof mass along the axis; and
- a second electrical circuit configured to convert the output to a measured acceleration of the body knowing the mass of the proof mass and the stiffness of the first and second flexure assemblies.

\* \* \* \* \*